July 1, 1930.   W. CLAYTON   1,769,770
ANIMAL TRAP
Filed Oct. 17, 1928

Walter Clayton
Inventor
By C. A. Snow & Co.
Attorneys.

Patented July 1, 1930

1,769,770

UNITED STATES PATENT OFFICE

WALTER CLAYTON, OF BELMAR, NEW JERSEY

ANIMAL TRAP

Application filed October 17, 1928. Serial No. 313,053.

This invention relates to animal traps, one of the objects being to provide a simple and efficient trap to be used in catching rodents and other animals, said trap being so constructed as to trap the animal at all times by gripping its head and killing it instantly without injury to the fur.

Another object is to provide a trap which can be suspended over and at the sides of the hole used by the animal to be trapped, it being impossible for the animal to enter or leave the hole without springing the trap.

Another object is to provide a trap which can be suspended in water and operate as efficiently as when located above the ground.

A still further object is to provide a trap which can be so modified as to catch an animal without killing it.

With the foregoing and other objects in view which will appear as the description proceeds, the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawings the preferred forms of the invention have been shown.

In said drawings.

Figure 1:
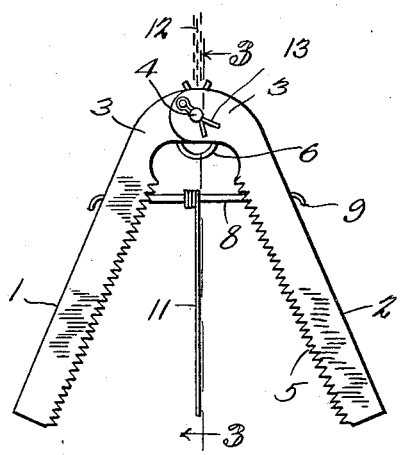
Figure 1 is a front elevation of the trap set for use.

Referring to the figures by characters of reference, 1 and 2 designate opposed channeled strips of metal forming the jaws of the trap, each of these strips has one end portion offset as shown at 3. One of the channeled strips is narrower than the other where offset so that one of the offset portions can extend into the other, the two being connected by a pivot pin 4. The longitudinal edges of the strips 1 and 2 are preferably toothed as shown at 5, the teeth being so arranged as to grip an animal therebetween when the strips are shifted toward each other. A spring 6 straddles the pivot 4 and bears at its ends against the strips 1 and 2 so as to force said strips normally toward each other.

Each of the strips 1 and 2 has an opening 7 therein and seated loosely in these openings are the end portions of a rod 8 constituting a part of the trigger of the trap. Each end of the rod is offset as at 9 to prevent its withdrawal from the strip 1 or 2 in which it is seated and adjacent each of these offset portions is a shoulder 10. A finger 11 is fixedly connected to the rod 8 and is adapted to hang between the jaws or strips 1 and 2 when the trap is set.

Figure 2:
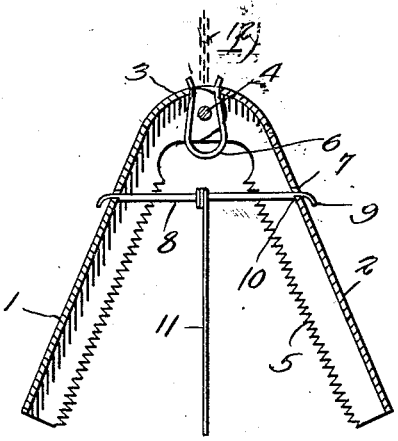
Figure 2 is a vertical transverse section therethrough.
Figure 3:
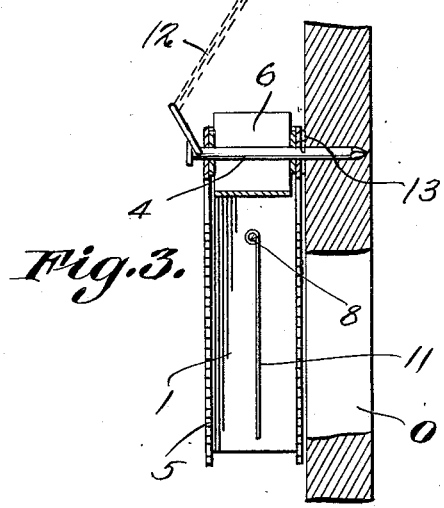
Figure 3 is a section on line 3—3, Figure 1.
Figure 4:
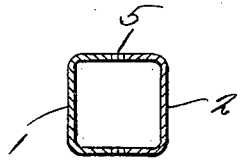
Figure 4 is a transverse section through the jaws of the trap, said jaws being closed together.
Figure 5:
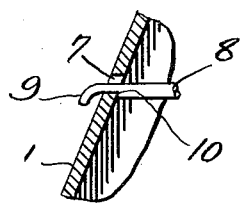
Figure 5 is an enlarged section through a portion of one of the jaws showing a part of the trigger in engagement therewith for holding the jaws open.

In using this device the trap is fastened by a chain 13 so it cannot be carried away by a trapped animal.. The pin 4 is in the form of a nail and may be held in place by a cotter pin 13. This pin or nail can be driven into a wall to hold the trap in position. The trap can be arranged to bridge the opening O through which passes the animal to be trapped. While the finger 11 is suspended, the jaws 1 and 2 are pulled apart until the shoulders 10 drop to position between the jaws as shown in Figures 2 and 5, thereby holding the jaws set against the action of the tensioned spring 6.

When an animal endeavors to pass through the hole O it necessarily brings its head between the jaws 1 and 2 and against the finger 11. The finger when shifted will cause rod 8 to rotate and a very slight movement of this rod will disengage shoulders 10 from the jaws. Consequently the jaws will be snapped toward each other by the spring and will grip the head of the animal between them.

Figure 6:
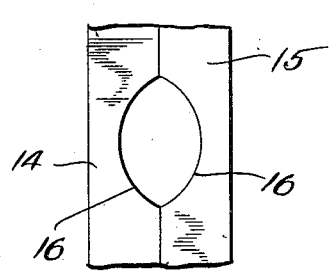
Figure 6 is a side elevation showing portions of cooperating jaws of a modified construction for trapping animals without killing them.

Should it be desired to trap an animal without killing it the sides of the jaws 14 and 15 could be cut away as shown at 16 in Figure 6. The finger 11 would also be bent so as not to be touched and actuated until the head of the animal has passed from between the jaws. Thus when the trap is sprung the jaws will come together about the neck of the animal without crushing it.

What is claimed is:

1. A trap including opposed pivotally connected spring controlled jaws, a rod extending loosely through the jaws and bridging the space therebetween, means on the rod for engaging the jaws to hold them spread apart, and depending means on the rod for actuation by an animal entering between the jaws from either direction, thereby to rotate the rod and to disengage the holding means from the jaws.

2. A trap including opposed pivotally connected spring controlled jaws, a rod extending loosely through apertures in the jaws and bridging the space therebetween, the diameters of the apertures being greater than the maximum diameter of the rod, there being recesses in the rod for receiving the lower portions of the walls of the apertures thereby to hold the jaws spread apart, and means depending from the rod for actuation by an animal entering between the jaws from either direction, thereby to rotate the rod and disengage the recessed portions from the edges of the apertures so as to release the jaws.

In testimony that I claim the foregoing as my own, I have hereto affixed my signature.

WALTER CLAYTON.